United States Patent [19]
Burek et al.

[11] Patent Number: 6,151,436
[45] Date of Patent: Nov. 21, 2000

[54] SPLICE CLOSURE WITH EXTENDED COVER

[75] Inventors: Denis Edward Burek, Cumming; Marc Duane Jones, Lithonia; John Francis Malluck, Marietta, all of Ga.

[73] Assignee: Lucent Technologies Inc., Murray Hill, N.J.

[21] Appl. No.: 09/258,188

[22] Filed: Feb. 25, 1999

[51] Int. Cl.[7] .................................................. G02B 6/00
[52] U.S. Cl. ......................................... 385/135; 385/134
[58] Field of Search .............................. 385/95, 134, 135, 385/136, 137, 138, 139

[56] References Cited

U.S. PATENT DOCUMENTS 5,472,160  12/1995  Burek et al. ............................ 248/74.4
5,862,290  1/1999  Burek et al. ............................ 385/135

*Primary Examiner*—Phan T. H. Palmer

[57] ABSTRACT

An optical fiber cable splice closure has a base member and a cover mated therewith. The cover is extended to accommodate stacking large numbers of splice trays or splice holders so that the coverall capacity of the closure is increased over prior art structures. The extended cover has a plurality of longitudinal and transverse strengthening ribs molded integrally with the top and side walls of the cover. For increased resistance to outside forces, the top wall is bowed and strengthened and supported by the ribs both above and below the wall. In a second embodiment, the side walls are also bowed, as are the strengthening ribs.

12 Claims, 5 Drawing Sheets

SPLICE CLOSURE WITH EXTENDED COVER

FIELD OF THE INVENTION

This invention relates to optical fiber cable splice closures and, more particularly, to a splice closure having an extended cover for increased closure capacity.

BACKGROUND OF THE INVENTION

Signal transmission through optical fibers has become, or is becoming, the dominant signal transmission mode. The bandwidth characteristics of optical fibers, as well as their relative immunity to certain types of interference and contaminants make optical fibers the desirable transmission medium in high capacity trunk lines as well as in lower capacity feeder and distribution lines.

No matter what the intended end use may be, individual optical fibers generally are combined in an optical fiber cable which contains a plurality of such fibers, each of which is protected by at least one layer of coating material. In one configuration, the fibers are assembled into groups which are held together by binder ribbons or tubes to form a cable core. This is generally enclosed in a metallic or plastic tube or jacket which, in the latter case, often contains one or more strength members, typically of metal, such as heavy gauge wire. In another configuration, the fibers are arrayed in ribbon form and the core tube contains one or more stacked ribbons as well as strength members if desired.

Regardless of the cable configuration, it is usually necessary that the lengths of fiber cable be spliced at their ends to the ends of other cables, which entails splicing each of the individual fibers in a cable to a corresponding individual fiber in the second cable. To this end, there is provided a splice closure which usually comprises a protective case which contains at least one splice tray which, in turn, has a plurality of splice holders mounted thereon, into which the encased individual fiber splices are inserted and held. The cables are entrant into the case and generally are clamped to each end thereof to reduce the effects of tensile forces on the cables and on the splices. In U.S. patent application Ser. No 08/847,214 now U.S. Pat. No. 5,862,290 of Burek et al. (Burek Case 15-11) there is shown an optical fiber cable splice closure, generally for use outdoors such as in manholes or overhead cabling.

Inasmuch as, at the splice point, the cable itself is opened up and the base fibers are exposed, the only protection afforded the fibers is provided by the closure, which can provide only one or two layers of protection from the outside environment, and the requirements therefor are more stringent than for the cable, which normally provides several layers of protection. The closure must anchor the cables stored therein, and it must be capable of withstanding torsional and axial loads transmitted by the cable to the closure so that the splices are protected from these loads. The closure must also seal the inner and outer sheaths of the cables and maintain the seal integrity under extreme environmental conditions. In addition, the closure must provide adequate fiber storage for slack fiber without damaging the fibers and without increasing signal attenuation. The closure preferably should be capable of storing any type of splice, such as, for example, discrete mechanical, discrete fusion or mass fusion, or other types while reducing forces that tend to damage the splices. Additionally, the closure should provide adequate grounding and anchoring for the metallic strength members of the cable. The closure should also be capable of accepting high fiber count cables as well as those of low fiber count.

In order to insure protection of the splices from moisture, it is current practice to form the closure out of two mating halves, a base and a cover, with a grommet therebetween, and clamp them together. Cable entry is through openings in the grommet, which are usually supplied with inserts which seal the cable and in turn are sealed by the grommet. Such a grommet and insert arrangement is shown, for example, in U.S. Pat. No. 5,472,160 of Burek, et al.

Cables entrant into the enclosure are preferably, and in present day usage, almost always anchored to the splice enclosure itself, to guarantee a minimum of movement of the cable within the enclosure which could unduly stress the fibers and the fiber splices. One such anchoring means, in the form of a cable grip block, is shown in the aforementioned Burek, et al. U.S. Pat. No. 5,472,160. The grip block of that patent is capable of adapting to cables of different sizes, and also provides an anchor for the cable central strength member which is a usual component of loose tube type cables. The anchoring arrangement for the cable sheath strength member, a usual component of loose tube and unit tube cables, requires that the strength member or members be cut to a specific length and bent upward into a slot within the grip member. The strength members are maintained within the slots against tensile forces because of their rigidity and because they are bent at a right angle. Thus, they function to help maintain the cable against shifting or movement. The strength members, as pointed out hereinbefore, are preferably of metal and are typically grounded by connection to a ground bolt and lug which passes through a wall of the closure to the outside thereof. The lug, in turn, is connected to earth ground, and is sealed to the outside of the wall of the closure.

As is shown in the aforementioned Burek et al. application and the Burek et al. patent, individual splices are mounted on (or in) splice trays which can be stacked to accommodate up to 144 splices. With the large increases in optical fiber usage and in optical signal transmission, and with space limitations, the trend has been toward increasing the fiber splice capacity of splice closures. One arrangement for producing increased splice capacity relies upon increasing the number of splice trays in a stack in such closures as those of Burek et al. Other arrangements for stacking trays or equivalent splice holders have been developed commercially which are adaptable to the two pedestal splice tray holding arrangements of the Burek et al. closures. Thus, the so-called Ditel Pedestal Plate can be mounted on the dual pedestals of the Burek et al. enclosure, and the splice trays stacked upon a threaded rod extending from the pedestal plate. With either the Ditel or Burek et al. arrangement, the splice trays can be stacked to the extent that up to 432 discrete fiber splices may be mounted or held.

Necessarily, these stacks require an increased amount of vertical room, which is achieved by extending the splice closure cover. However, an extended cover is unavoidably weakened, or made less resistant to outside forces such as, for example, water pressure in a manhole. It is not uncommon for manholes to contain large amounts of water, even as much as a twenty foot stand of water in a thirty foot deep manhole. When the closure with the extended cover is at the bottom of such a manhole, the twenty foot stand of water can exert enough force on the cover to collapse it, or at least to bend it severely, thereby possibly destroying the water-tight integrity of the closure. Thus, it is highly desirable that the splice closure and cover therefor be so constructed as to resist these outside forces so that the interior components of the closure are protected from the deleterious effects of such forces such as, as previously mentioned, the destruction of the water-tight integrity of the closure.

SUMMARY OF THE INVENTION

The present invention is a splice closure of the general type disclosed in the aforementioned Burek et al. Pat. applications, but, through the use of an extended cover, has greatly increased splice storage capacity. The cover itself, which, like the remainder of the closure shell, is preferably made of a strong, hard, and rigid plastic material, has a plurality of strengthening ribs extending both longitudinally and transversely thereof to produce a cover that is highly resistant to outside forces. However, as in the case of, for example, a twenty foot stand of water, the pressure of the water can still overcome the strengthened portion of the cover and cause it to warp or collapse, with potential disastrous results.

The cover of the invention, on the other hand, has an additional strengthening configuration in the form of a curved or bowed top (or bottom) surface. This curved surface is molded or cast integrally with the transverse strengthening ribs so that it presents an unusually strong and stiff top for the cover, with a portion of the ribs being located inside of the cover and a portion thereof outside of the cover. Such a curved surface greatly enhances the resistance of the cover to outside forces, with a consequence that the integrity of the closure is maintained.

In a second embodiment of the invention, still more force resistance is added through curved or bowed side walls. Preferably, the side walls and ribs therefor are integrally molded, but the ribs do not extend into the interior of the closure, where they might interfere with the placement or location of other components of the splice closure.

The various principles and features of the present invention will be more readily apparent from the following detailed description, read in conjunction with the accompanying drawings.

DETAILED DESCRIPTION

Figure 1:
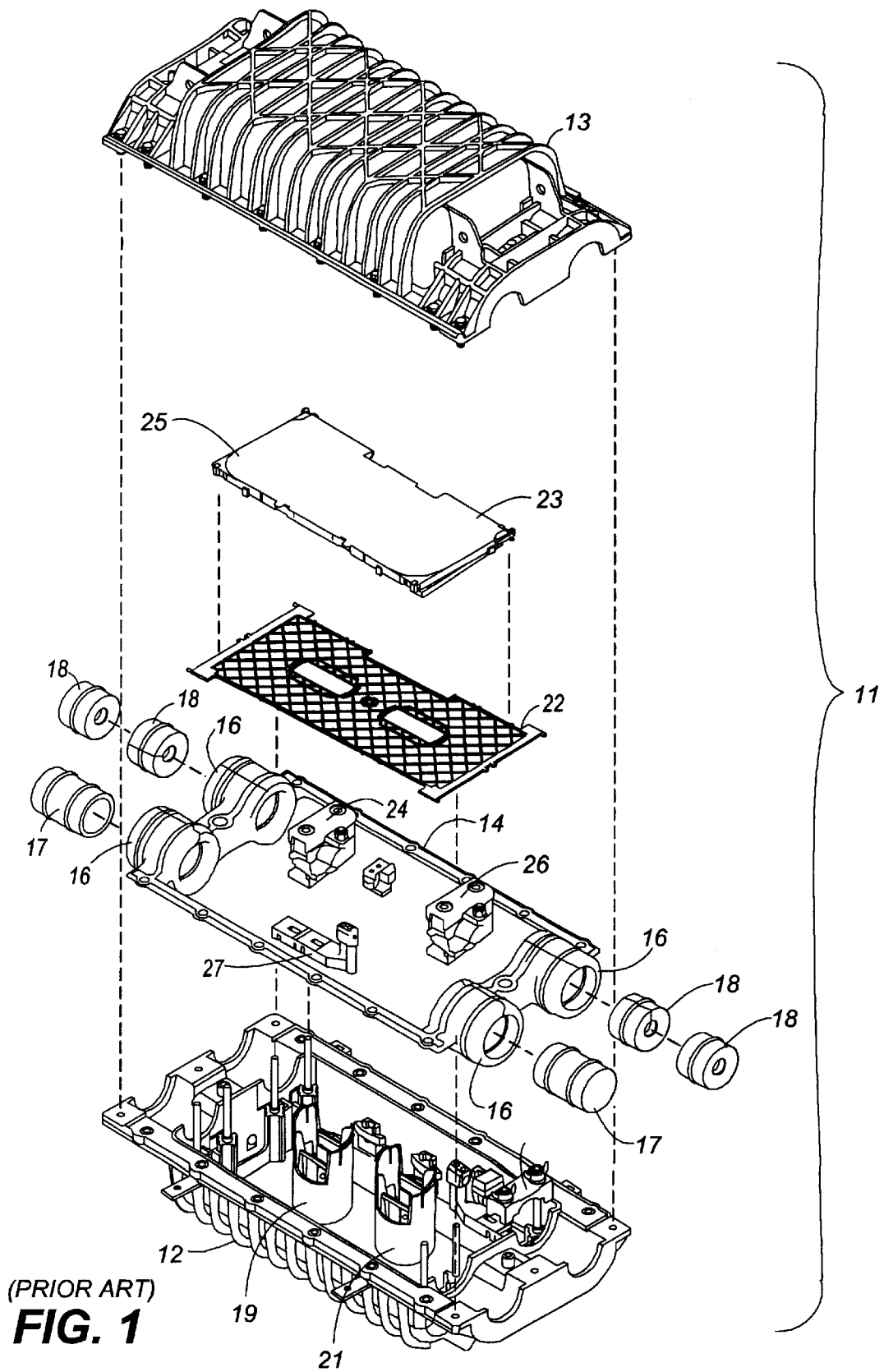
FIG. 1 is an exploded perspective view of the prior art splice closure disclosed in, for example, the aforementioned Burek et al. applications.

In the following detailed description, like parts bear the same reference numerals throughout the several views.

In FIG. 1 there is shown an exploded view of a splice closure 11 as shown in the aforementioned Burek et al. applications and also as shown in U.S. Pat. No. 5,862,290 of Burek et al Closure 11 comprises a base member 12 of suitable material such as hard, rigid, high strength plastic and a cover member 13. Members 12 and 13 are virtually identical and can be produced in the same molds. A racetrack grommet 14 provides a cover to base seal as shown, grommet 14 has four cable entrance and exit ports 16, and appropriate inserts 17 and 18 therefor. Within base member 12 and resting on the floor thereof are first and second support pedestals 19 and 21 which are adapted to support a pedestal plate member 22. Pedestal plate member 22 in turn supports one or more fiber organizers or splice trays 23 and cover 25, which are adapted to be stacked on member 22, each tray 23 being pivotally mounted to the tray immediately below it (not shown). Closure 11 also contains grip block members 24 and 26 and a central strength member grip 27. The cover 13 fits over the components and mates with base member 12, being sealed thereto by racetrack grommet 14.

Figure 2:
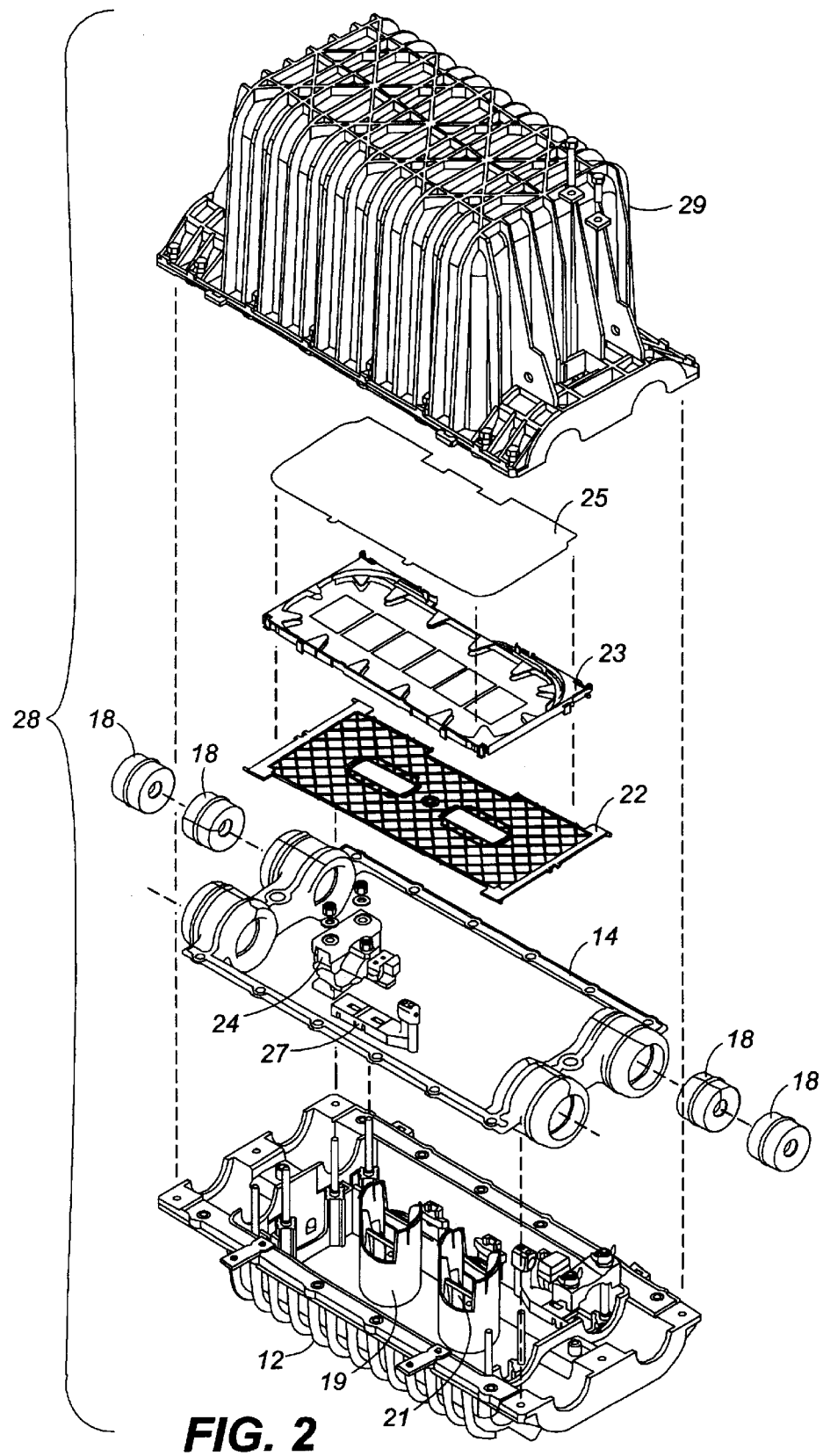
FIG. 2 is an exploded perspective view of a similar splice closure as modified for increased splice capacity.

Because of the limited height of cover member 13, only a limited number of splice trays 23 may be stacked on pedestal plate member 22, the total splice capacity being approximately 144 discrete fiber splices. In FIG. 2 there is shown a preferred embodiment of the invention which comprises a splice closure 28 having an extended cover 29 which permits stacking a sufficient member of trays 23 to accommodate 648 splices, or enough mass splice trays, which is the subject matter of U.S. patent. application Ser. No. 08/851,102 now U.S. Pat. No. 5,896,486 of Burek et al., to accommodate 2016 splices. Thus, the extended cover 29 makes possible a considerable increase in the number of splices that can be safely contained within closure 28. However, as pointed out hereinbefore, simple extended cover member 29 is not sufficient to guarantee the resistance of the closure 28, and, more particularly, the cover 29, to outside forces applied to closure 28. Thus, cover member 29 must be designed and construed to withstand these forces.

Figure 3A:
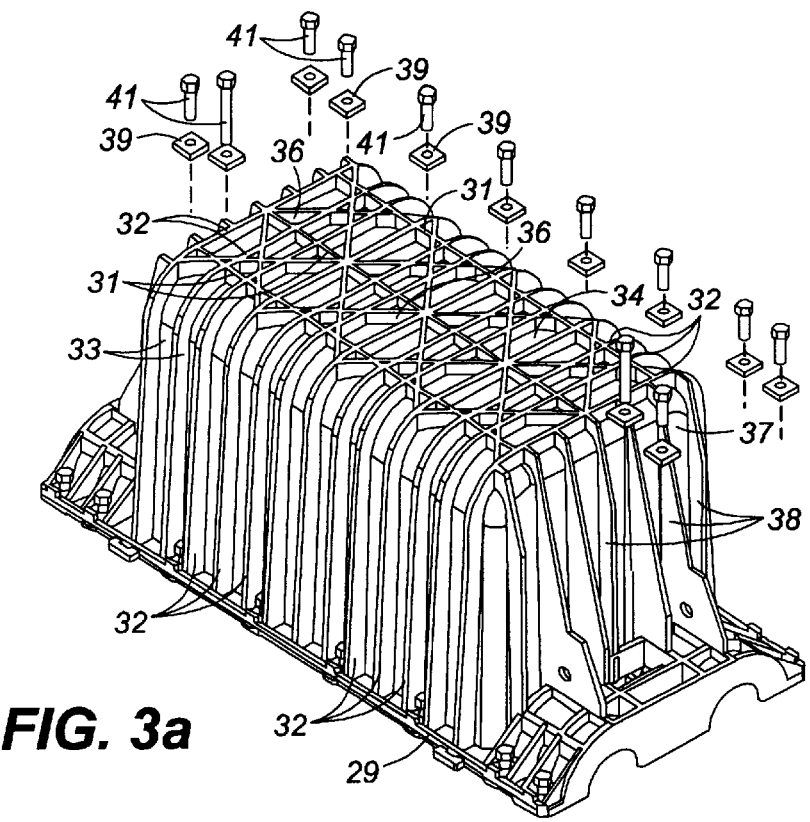
FIG. 3a is a perspective view of the extended cover of the invention.
Figure 3B:
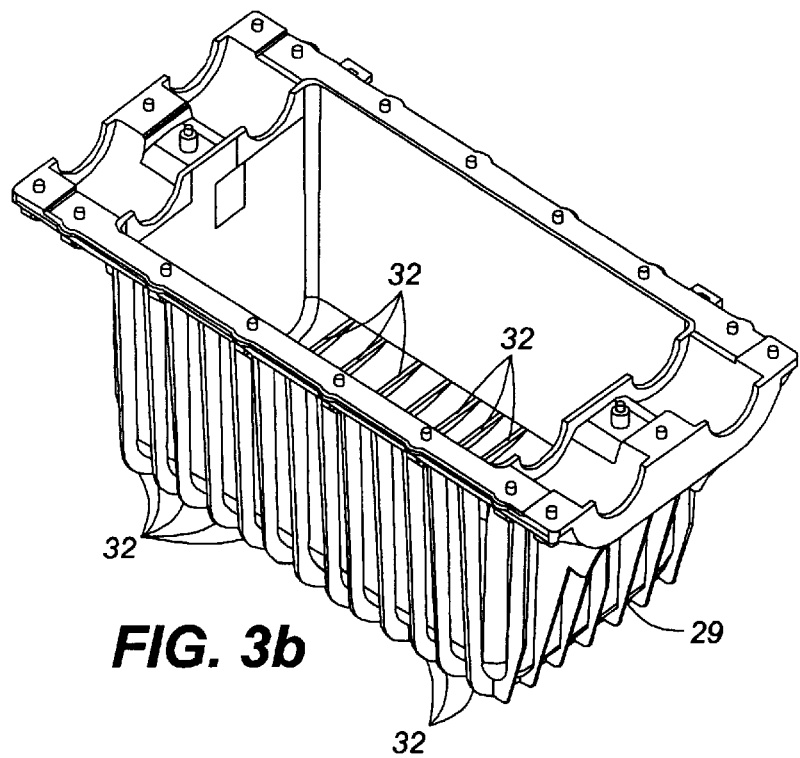
FIG. 3b is a different perspective view of the extended cover of the invention showing a portion of the interior thereof.
Figure 3C:
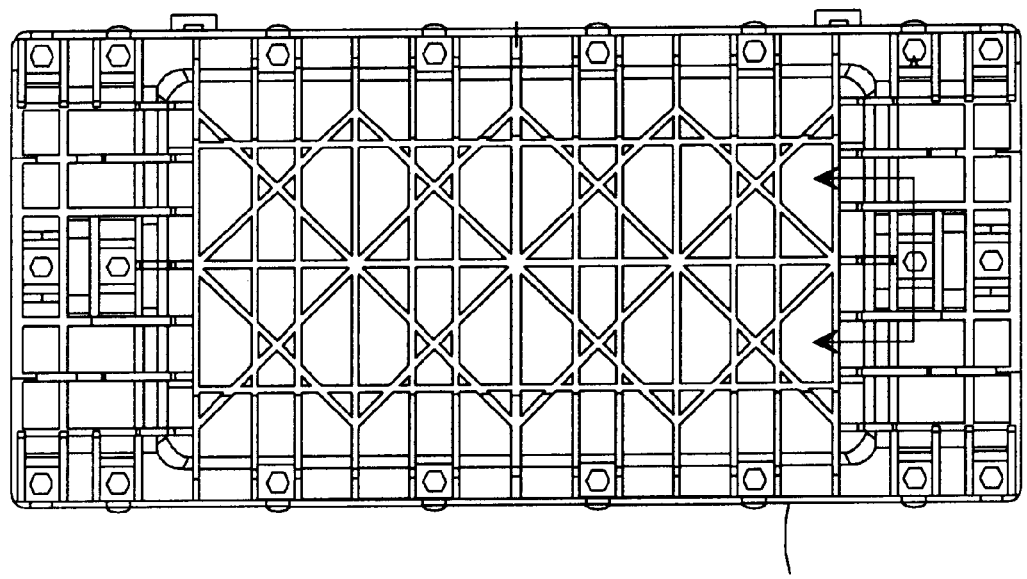
FIG. 3c is a plan view of the cover of FIGS. 3a and 3b.
Figure 3D:
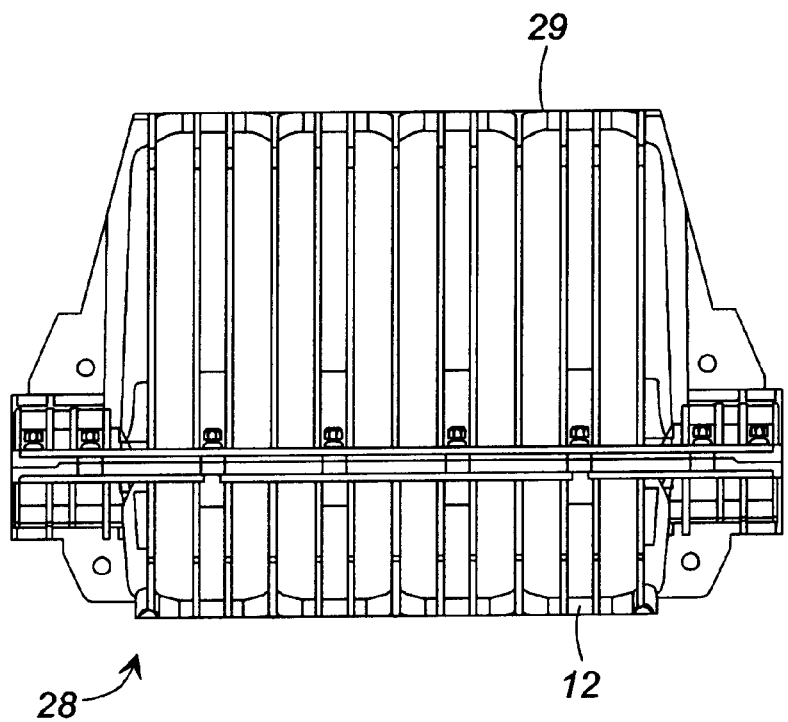
FIG. 3d is a side elevation view of the closure of the invention, with the base member and the cover in place.

In FIGS. 3a to 3c there is shown the extended cover member 29, and in FIG. 3d, the assembled splice closure 28, comprising base member 12 and extended cover 29. As best seen in FIGS. 3a and 3b, cover 29 as molded has a plurality of longitudinal strengthening ribs 31, and a plurality of transverse strengthening ribs 32, which strengthen both the side walls 33 and the top (as viewed in FIG. 3a) surface 34, being vertically oriented on the center surface of the side walls. For additional strength, diagonal ribs 36 are positioned on the top surface 34. The end walls 37 also are strengthened by vertical ribs 38. The ribs 31, 32, and 36 are preferably integral with their respective surfaces. A plurality of nuts 39 and bolts 41 are shown as indicative of any of a number of possible means for joining cover 29 to base 12. The term "top" corresponds to the orientation as shown in the figures, and not necessarily to the orientation of the closure in use.

Figure 4:
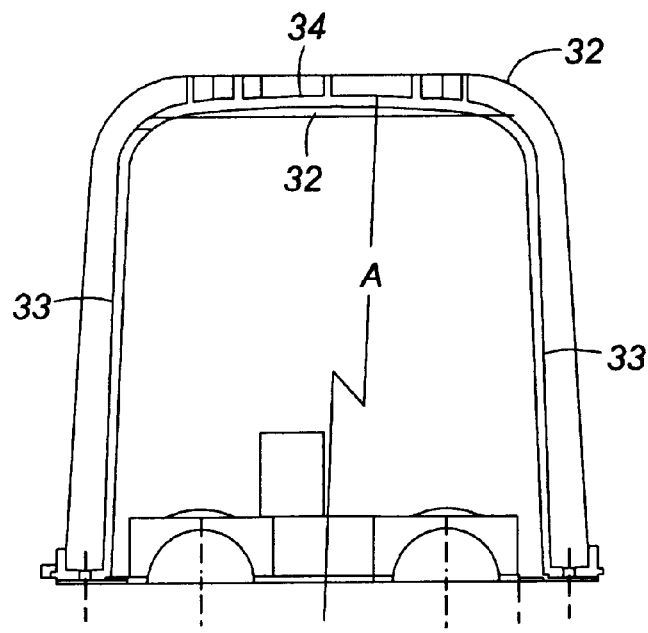
FIG. 4 is a cross-sectional view of the cover of FIGS. 3a through 3d.
Figure 5:
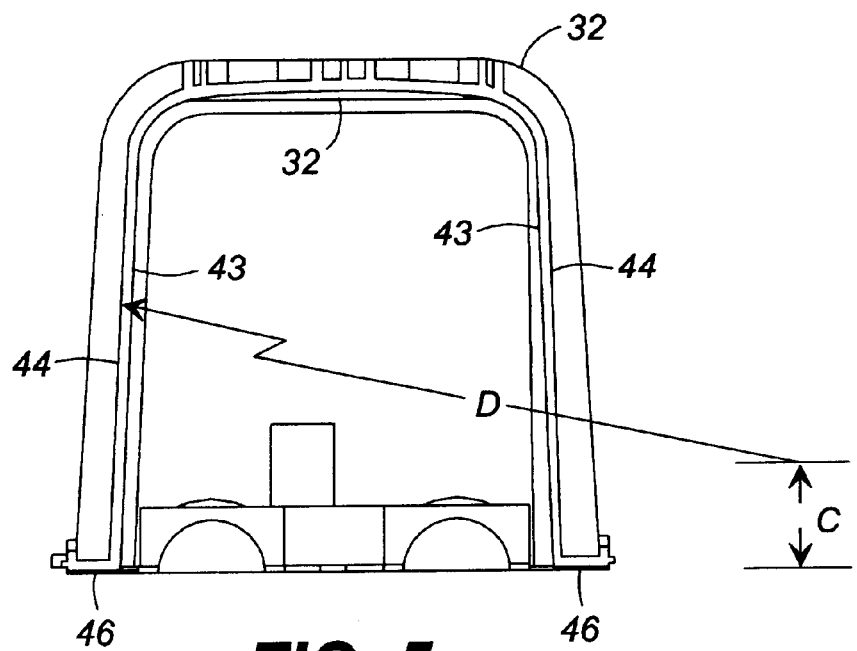
FIG. 5 is a cross-sectional view of another embodiment of the cover of FIGS. 3a through 3d.

In accordance with one aspect of the invention, and as is best seen in FIG. 4, top surface 34 is curved or bowed with a radius A, which preferably is within the range of 28 to 32 inches, with 30 inches being preferred. As can be seen in FIG. 3, top surface 34 is not located along the bottom edge of the ribs 32, but, over a portion of its width, is located approximately mid-way between the top and bottom edges of ribs 32. Inasmuch as surface or top wall 34 is molded integrally with the ribs 32, the combination of the top 34 and ribs 32, wherein ribs 32 support or strengthen top 34 below as well as above it, the structure is considerably stronger and more resistant to outside forces incident upon the closure, such as shock, water pressure, and the like. It can be seen in both FIGS. 3b and FIG. 4 that ribs 32, which are not bowed, actually extend into the interior of the cover, and, hence, the closure. However, such intrusion into the interior does not interfere with any of the other components within the closure In FIG. 5 there is shown a second embodiment of the invention wherein the side walls 33 are also bowed outwardly with a radius D of, for example, 42 to 46 inches. The ribs 32 are not bowed but have a varying width and do not extend or intrude into the interior of the closure in order that there be no interference with the internal components or structure of the closure. The side walls 33 have straight interior surfaces 43 which are canted or sloped at approximately a two degree (2O) angle from bottom to top. The outer surfaces 44 of side walls 33 are bowed, as shown, the locus of their radius D being a distance C above the plane of the flanges 46 of the cover 29. The distance C is preferably in the range of two and one-half inches (2½") to three inches (3"), with approximately two and three-quarter inches being preferred. In the side wall configuration as shown in FIG. 5, the curvature of the outer surfaces 44 begins at approximately three and one half inches (3½") from the plane of the flanges 46. This is not an absolutely necessary configuration, but it does serve to facilitate removal of cover 29 from the mold.

The extended cover of the invention allows the stacking of numerous splice holders or trays within the closure, without any sacrifice of structural strength. The cover of the invention is sufficiently resistant to outside forces that the closure integrity is maintained despite these forces, and the physical location of the splice closure is not dependent upon avoidance of such forces.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention, as set forth in the claims. Further, in the claims hereinafter, the corresponding structure, materials, acts, and equivalents thereof of all means or step plus function elements are intended to include any structure, material, or acts for performing the functions with other elements as specifically claimed.

What is claimed is:

1. An optical fiber cable splice closure comprising:

a base member;

an extended cover having an exterior and an interior member;

a sealing grommet between said base member and said extended cover member;

said extended cover member having a top wall and a first and second side walls, said top wall having longitudinally extending strengthening ribs and transversely extending strengthening ribs; and said top wall being integral with said strengthening ribs and having a radius of curvature sufficient to cause at least a portion of the transverse ribs to extend into said interior of said cover member.

2. An optical fiber cable splice closure as claimed in claim 1 wherein said radius of curvature is within the range of 28 to 32 inches.

3. An optical fiber cable splice closure as claimed in claim 1 wherein said radius of curvature is approximately 30 inches.

4. An optical fiber cable splice closure as claimed in claim 1 wherein said first and second side walls each has a curved configuration.

5. An optical fiber cable splice closure as claimed in claim 4 wherein said curved configuration has a radius of curvature within the range of 28 to 32 inches.

6. An optical fiber cable splice closure as claimed in claim 5 wherein said radius of curvature is approximately 30 inches.

7. An extended cover for use in a closure, said extended cover comprising:

a top wall having inner and outer surfaces and first and second side walls having inner and outer surfaces depending therefrom;

said top wall having a plurality of longitudinally extending and transversely extending strengthening ribs said outer surface;

said transversely extending ribs extending vertically along the outer surfaces of said side walls; and said top wall being bowed outwardly with a radius of curvature within the range of 28 to 32 inches.

8. An extended cover as claimed in claim 7 wherein said strengthening ribs are integral with said top wall and said side walls.

9. An extended cover as claimed in claim 8 wherein said radius of curvature is approximately 30 inches.

10. An extended cover as claimed in claim 9 wherein said radius of curvature of said side walls is approximately 44 inches.

11. An extended cover as claimed in claim 7 wherein said side walls are bowed outwardly with a radius of curvature within the range of 42 to 46 inches.

12. An extended cover as claimed in claim 7 wherein said transverse ribs extend through said top wall beyond the said inner surface thereof.

* * * * *